US008457962B2

(12) United States Patent
Jones

(10) Patent No.: US 8,457,962 B2
(45) Date of Patent: Jun. 4, 2013

(54) REMOTE AUDIO SURVEILLANCE FOR DETECTION AND ANALYSIS OF WILDLIFE SOUNDS

(76) Inventor: Lawrence P. Jones, Smithfield, VA (US)

( * ) Notice: Subject to any disclaimer, the term of this patent is extended or adjusted under 35 U.S.C. 154(b) by 948 days.

(21) Appl. No.: 11/499,592

(22) Filed: Aug. 4, 2006

(65) Prior Publication Data

US 2007/0033010 A1 Feb. 8, 2007

Related U.S. Application Data

(60) Provisional application No. 60/705,989, filed on Aug. 5, 2005.

(51) Int. Cl.
G10L 19/00 (2006.01)
(52) U.S. Cl.
USPC ............ 704/243; 704/221; 704/223; 704/244
(58) Field of Classification Search
USPC ............. 704/E17.002, 270, 17.002, E17.001, 704/221, 223, 243, E17.005, E17.007
See application file for complete search history.

(56) References Cited

U.S. PATENT DOCUMENTS

| | | | | |
|---|---|---|---|---|
| 4,037,052 A * | 7/1977 | Doi | | 381/160 |
| 4,653,102 A * | 3/1987 | Hansen | | 381/92 |
| 4,752,957 A * | 6/1988 | Maeda | | 704/204 |
| 4,896,305 A | 1/1990 | Gimbal | | |
| 5,033,089 A * | 7/1991 | Fujimoto et al. | | 704/247 |
| 5,239,587 A | 8/1993 | Muckelrath | | |
| 5,342,144 A * | 8/1994 | McCarthy | | 405/39 |
| 5,452,364 A * | 9/1995 | Bonham | | 381/92 |
| 5,572,592 A | 11/1996 | Muckelrath | | |
| 5,761,159 A * | 6/1998 | Ashenafi | | 369/2 |
| 5,956,463 A * | 9/1999 | Patrick et al. | | 704/232 |
| 6,546,368 B1 * | 4/2003 | Weninger et al. | | 704/270 |
| 6,847,892 B2 * | 1/2005 | Zhou et al. | | 701/213 |
| 7,149,315 B2 * | 12/2006 | Johnston et al. | | 381/92 |
| 7,377,233 B2 * | 5/2008 | Patton | | 119/712 |
| 7,454,334 B2 * | 11/2008 | Agranat | | 704/231 |
| 7,777,747 B1 * | 8/2010 | Krenz | | 345/501 |
| 2003/0050774 A1 * | 3/2003 | Feng | | 704/205 |
| 2003/0125946 A1 * | 7/2003 | Hsu | | 704/246 |
| 2004/0107104 A1 * | 6/2004 | Schaphorst | | 704/270 |
| 2004/0120531 A1 * | 6/2004 | Solderits | | 381/58 |
| 2007/0111767 A1 * | 5/2007 | Brown et al. | | 463/1 |

* cited by examiner

Primary Examiner — Pierre-Louis Desir
Assistant Examiner — Abdelali Serrou
(74) Attorney, Agent, or Firm — Kimberly A. Chasteen

(57) ABSTRACT

This invention provides remote audio surveillance by recording audio data via three microphones and storage on a removable digital mass storage device, operating on battery power. The housing is of a weather resistant design to withstand outdoor conditions. Recording can be done in person or recording times can be defined so that the unit will only 'listen' during the desired times of the day, on a day to day basis. The user does not have to be in the vicinity but simply programs the record time(s) and leaves the device in the woods. The device also has play back capabilities for any recorded audio data and can interface with personal computers via the removable digital mass storage device. In addition to the audio collection and playback capabilities, PC software will be provided with the device which will analyze the data and provide direction of sound (based upon relative amplitude of the 3 microphones) and distance of sound (based on absolute and relative recorded amplitudes).

6 Claims, 6 Drawing Sheets

REMOTE AUDIO SURVEILLANCE FOR DETECTION AND ANALYSIS OF WILDLIFE SOUNDS

CROSS-REFERENCE TO RELATED APPLICATIONS

This application claims the benefit of provisional patent application No. 60/705,989, filed 2005 Aug. 5 by the present inventor.

BACKGROUND OF THE INVENTION

1. Field of Invention

This invention relates to remote, unattended audio recording and data analysis for the purpose of obtaining behavioral and population information about wildlife based on the sounds and noises they make.

2. Prior Art

A majority of existing prior art relating to 'audio' and 'hunting' is focused on embellishments for decoys, game calls and audio amplification devices similar to hearing aids. However, U.S. Pat. No. 5,239,587 to Muckelrath does describe a device which records wildlife sounds, unattended, for a hunter. However, the means for providing unattended recording is by a continuous timer. The hunter would have to be present to physically begin the recording and would only be able to set one record time interval. Also, the audio is recorded on only one: microphone. With this configuration direction of sound determination with any accuracy would be impossible.

3. Objects and Advantages

One of the keys of successful wildlife management and hunting is the ability to determine populations and patterns of various species of birds and animals prior to hunting seasons. Biologists have the daunting task of estimating populations and stability of both game and non-game species. Given ever increasing budgetary constraints and resulting reductions in manpower, the task of spending time in the woods and listening to obtain accurate data is an increasingly difficult one. In the case of recreational hunting, successful scouting is the one most important factor which directly results in opportunity and game harvest. Examples of species where scouting by sound is effective include, but are not limited to, elk, Canada geese, Snow geese and wild turkeys. For the weekend hunter who has limited time to spend in the field and the professional guide who has multiple locations to scout, having a device which can 'listen' in their absence would accomplish their scouting objectives in an efficient manner.

Several objects and advantages of the present invention are;
(a) to provide remote recording capabilities by means of programmable record time intervals and light sensor technology;
(b) to provide three microphone configuration for direction of sound determination;
(c) to provide audio data analysis software specifically developed for analyzing wildlife sounds recorded with said device;
(d) to provide small size (FIG. 3 dimensions) for portability and ease of use;
(e) to provide digital technology for recording of audio data;
(f) to provide rugged weather resistant construction for out of doors use.

SUMMARY OF THE INVENTION

In accordance with the present invention, a device providing remote audio surveillance for detection of wildlife sounds comprises batteries as a power source, a microphone system for the recording of audio data, means for audio amplification and filtering, means to store audio data on removable digital mass storage device, means to program device to specify when device records (by hour and day) whereby enabling remote recording feature, means to playback recorded audio, and a weather resistant housing.

REFERENCE NUMERALS IN DRAWINGS

Figure 1:
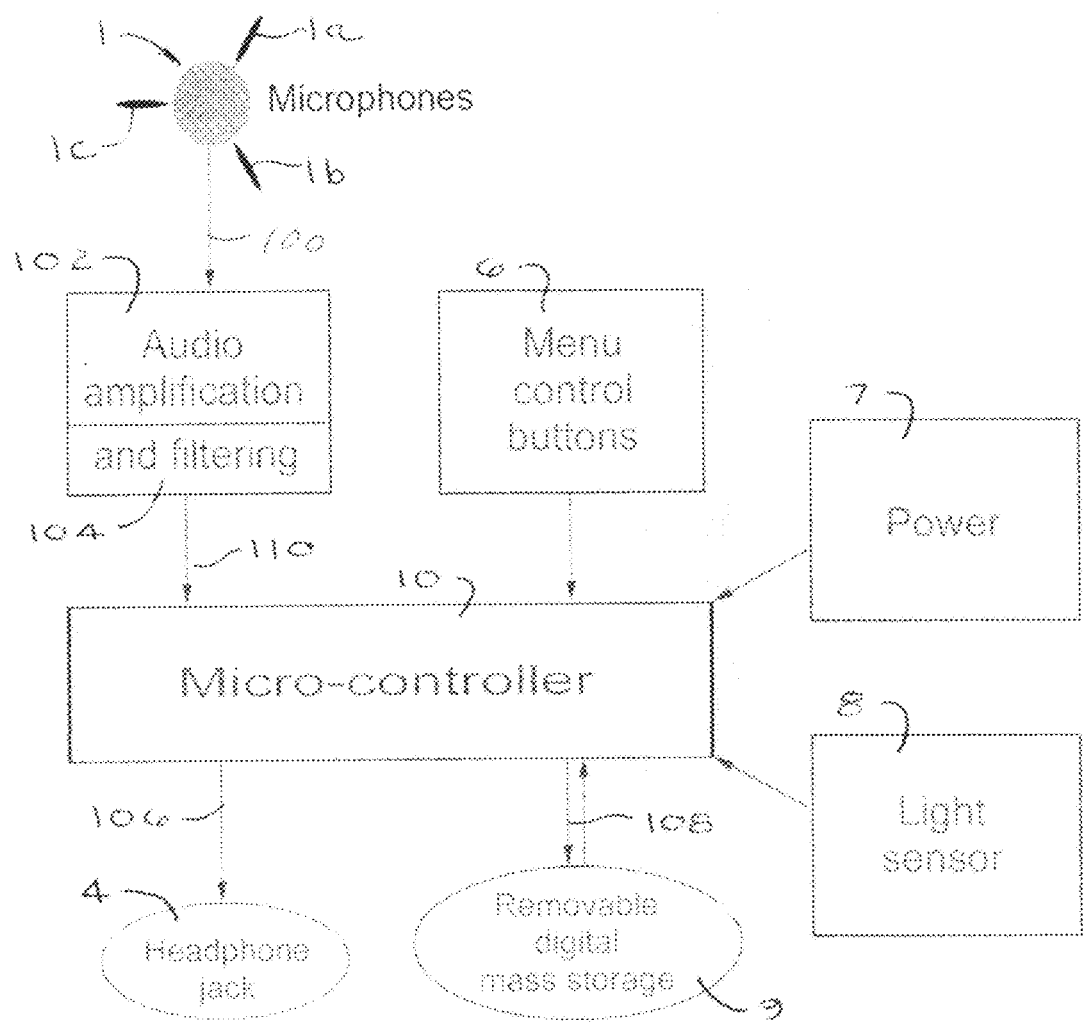
FIG. 1 is a block diagram which depicts the circuit for the device.

W Width
D Diameter
1 Microphone configuration
1a Microphone
1b Microphone
1c Microphone
2 input button
3 analog-to-digital converter
4 headphone jack
6 menu control button
7 battery power
8 light sensor
9 removable digital mass storage device
10 Micro-processor
12 Digital port
13 digital-to-analog (or PWM) converter
15 amplifier
18 clock
31 low drop out regulator
50 the device, generally
52 housing
52a housing bottom
52b housing top
54 ring
56 circuit board
58 menu control options, generally
60 LED
62 button
64 light sensor
100 recording process
102 amplification process
104 filter process
106 audio output
108 writing/recording process
110 amplified & filtered signal
112 maintaining record time intervals
114 playback of audio
200 inputs to micro-controller, generally
300 outputs from micro-controller, generally

DETAILED DESCRIPTION

FIG. 1—Preferred Embodiment

FIG. 1 details the block diagram for the device. To provide further clarification, audio is recorded 100 on a microphone configuration 1 consisting of three microphones 1a, 1b, 1c arranged 120 degrees apart. Once recorded 100, the audio signal will be amplified 102 and then filtered 104. The amplified and filtered signal 110 passes to a micro-controller 10. Other inputs to the micro-controller 10 include: menu control buttons (user interface) 6, battery power 7, a light sensor 8, and removable digital mass storage (which reads audio data for playback and profile updates) 9.

Outputs from the micro-controller 10 include: audio output 106 via a headphone jack 4 (for audio playback), and audio data recorded, i.e. stored 108 on the removable digital mass storage device 9.

Figure 2:
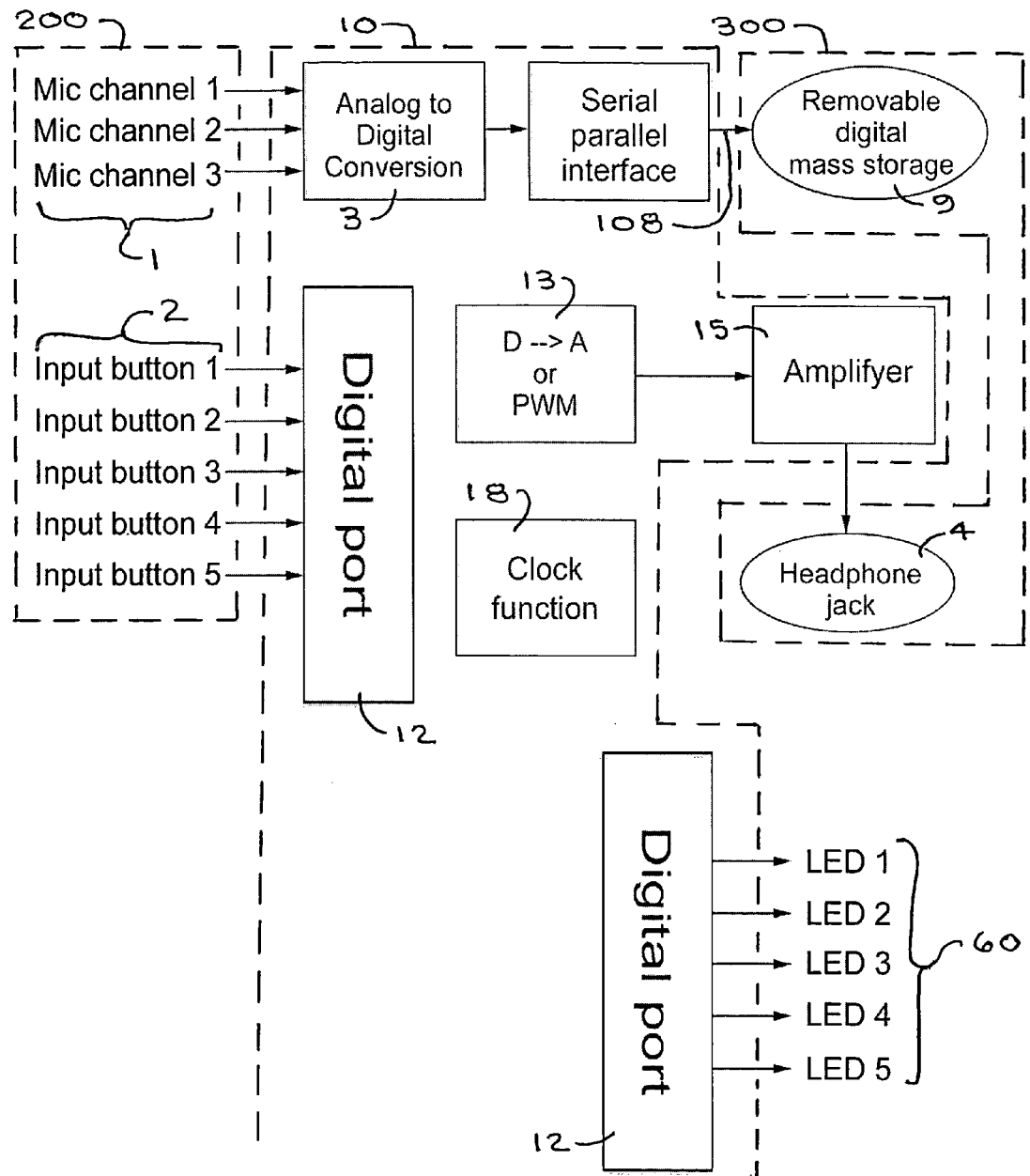
FIG. 2 is a block diagram depicting micro-controller logic flow chart.

FIG. 2—Preferred Embodiment

FIG. 2 details the micro-controller logic flow chart.

Inputs, generally indicated as 200 in FIG. 2., into the micro-controller 10 include: all microphone 1 channels and all input buttons (for user interface) 2.

Outputs, generally indicated as 300 in FIG. 2, from the micro-controller 10 include: writing (recording) 108 audio data to removable digital mass storage device 5; audio signal output 106 (which has been digital-to-analog converted or pulse width modulated 13 and amplified 7) to headphone jack 4; and LED indicators 10 to list current function and status.

Analog-to-digital conversion 3, pulse width modulation 13, clock function 18, and digital ports 12 are all functions performed within the micro-processor 10. The clock function 18 provides means to program the device to specify when the device records (by hour and day), thereby enabling unattended recording.

The following functions are controlled by the micro-controller 10: recording 110 of audio data, and writing 108 to removable digital mass storage device 9; maintaining 112 record time intervals, facilitating user interface; and playback 114 of audio.

Figure 3:
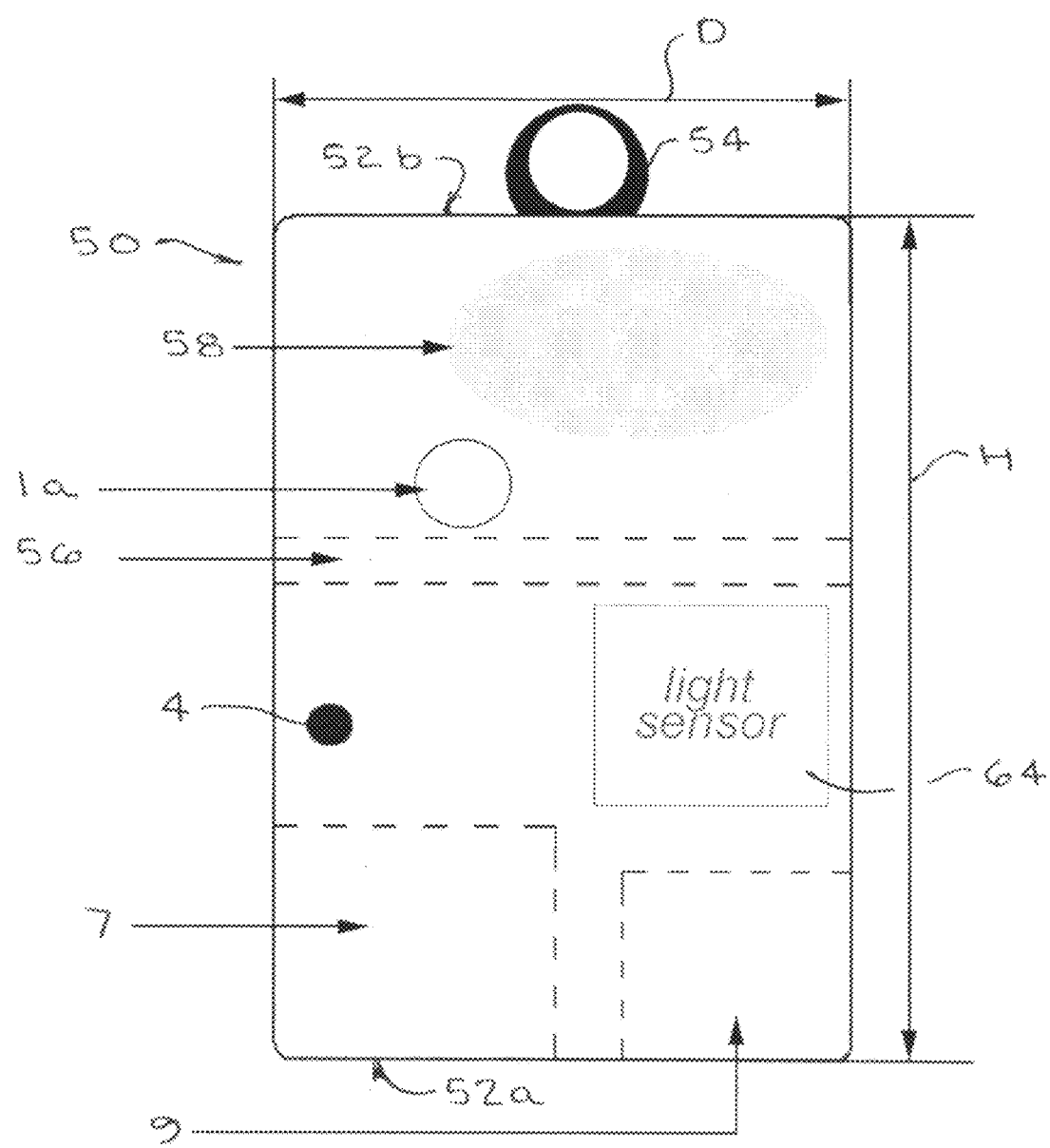
FIG. 3 is a front view showing details of the device.
Figure 4:
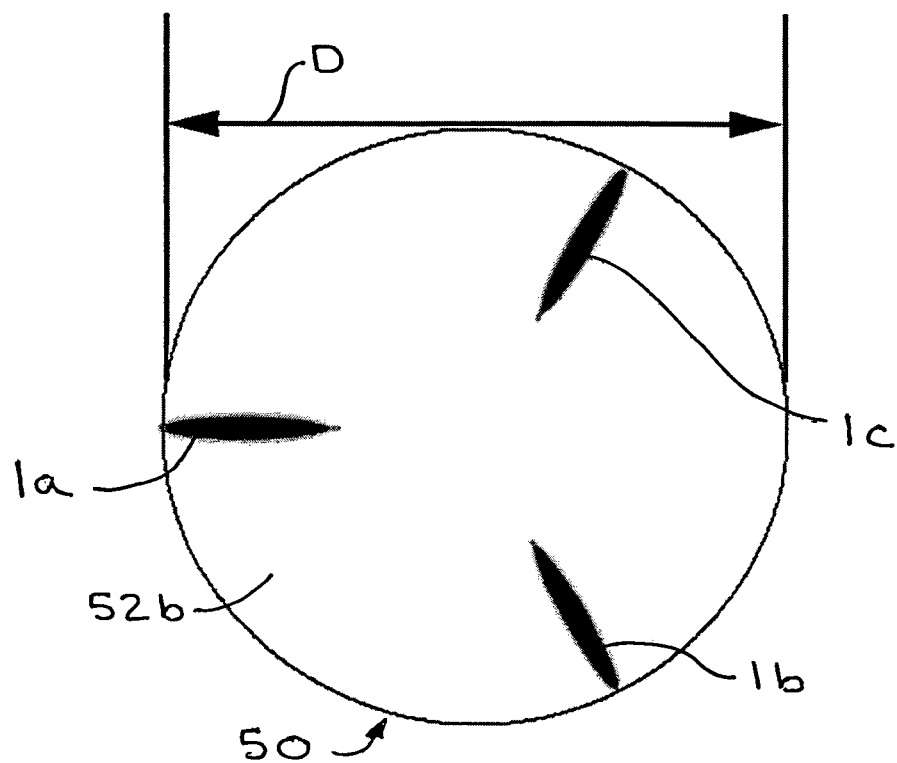
FIG. 4 is a top view of the device shown in FIG. 3.
Figure 5:
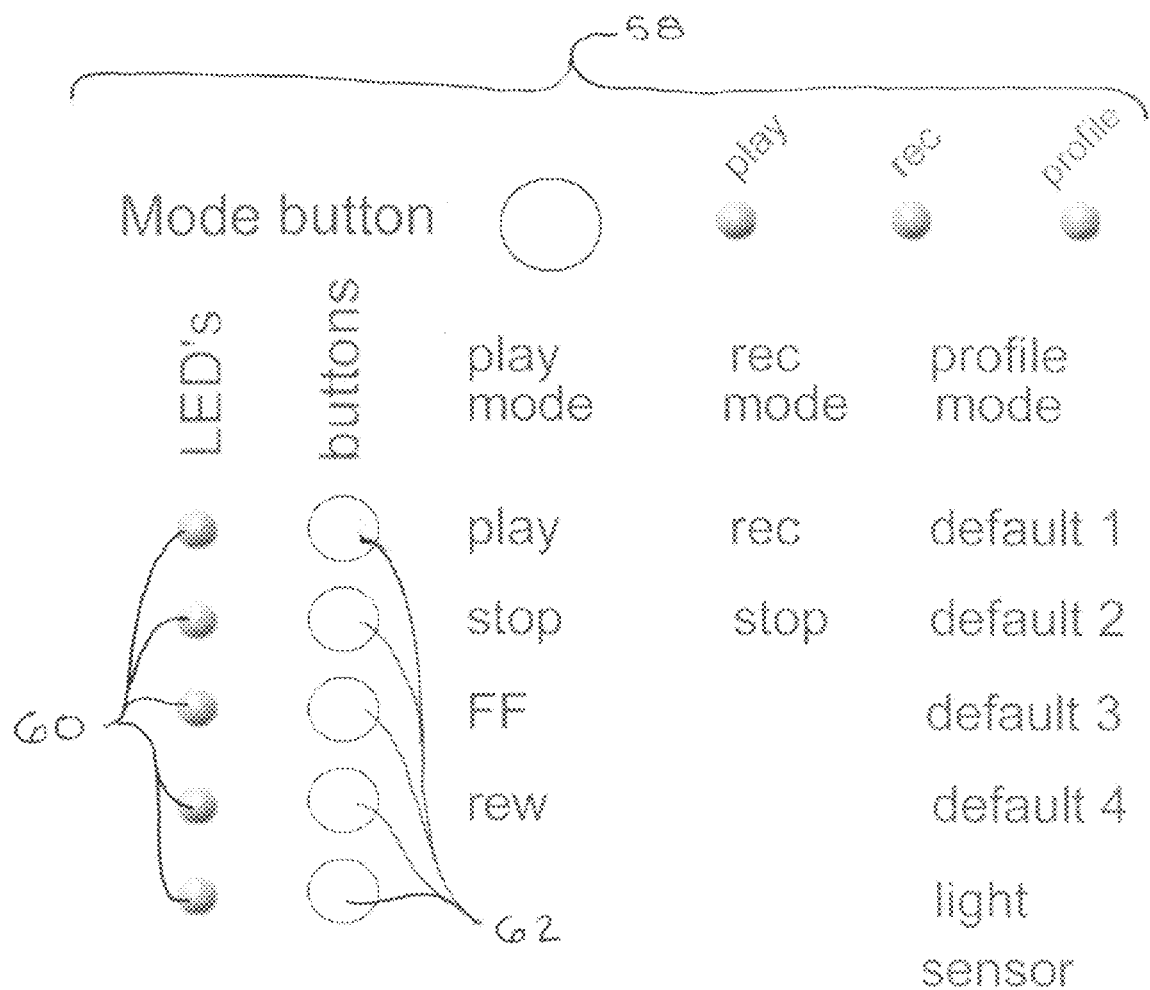
FIG. 5 is a front view showing the details of menu control options illustrated in FIG. 3.
Figure 6:
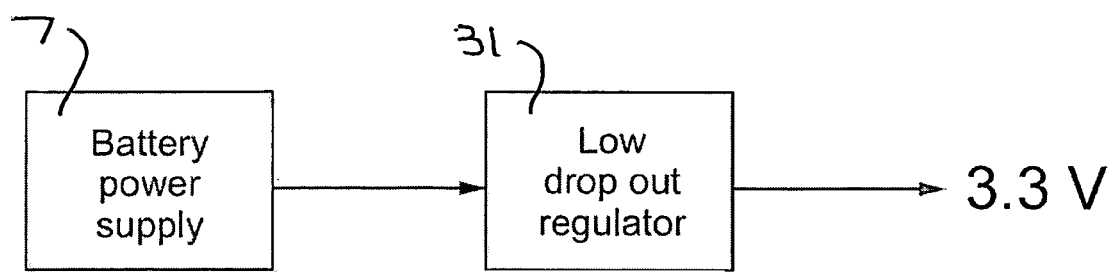
FIG. 6 is a block diagram showing power supply for the present invention.

FIGS. 3, 4 and 5—Preferred Embodiment

FIGS. 3 and 4 provide detailed drawings of the device, generally indicated as 50. The device 50 has a case comprising cylinder shaped, injection molded housing 52 with access to the interior through the bottom 52a. In the preferred embodiment of the invention housing 52 has a height (H) of approximately 5.0 inches and an outside diameter (D) of approximately 2.5 inches. At the top 52b of the housing a hanging ring 54 will be present. An electronics circuit board 56 will be located inside the housing 52. Protruding off of the circuit board 56 will be microphones 1a, 1b, 1c, user control buttons 62 and LED's 60.

Three microphones 1a, 1b, 1c are recessed into the housing 52 with a weatherproof sealant (not shown) to prevent moisture damage.

Menu control options 58, which are implemented with a series of LED's 60 and push buttons 62, as illustrated in FIG. 5, will protrude from the side of the housing 52 allowing the user access to the menu control options 58. Weatherproofing will be provided for all protrusions outside of the casing. A light sensor 64 is also mounted on the device; this will provide remote audio recording functionality based on the level of sunlight.

To facilitate audio playback (through headphones) a headphone jack 4 will be present on the device. Audio data is stored on removable digital mass storage device 9. Batteries 7 are used to power the device; battery access is provided at the bottom of the device.

Audio Analysis—Preferred Embodiment

In addition to the hardware device, the invention also consists of means to analyze the recorded data (specialized computer software). Data analysis is performed on a PC. Transfer of the audio data is facilitated by the removable digital mass storage device 9. A flash or SD (example of possible formats) card reader connected to the PC provides the analysis software with access to the audio data. The data analysis components are twofold: ability to infer direction of sound and distance of sound.

Direction of sound is determined by comparing the relative amplitude, for a given sound, of the three microphones 1a, 1b 1c. The relative amplitudes are compared and the microphone direction with the greatest would indicate the direction the sound originated from. If there are identical amplitudes on two adjoining microphones then linear interpolation will be used to derive the point between the two microphones that the sound originated. Sound distance will be calculated based on the absolute amplitude of the microphone registering the highest amplitude. The analysis will factor in temperature, terrain factors (i.e. open vs. wooded) and stage of foliage on trees. Based on this type of analysis, direction and distance of sound can be inferred for a given point in time. Considering this, a time series analysis can provide flight patterns, roost patterns and indicate the number of a particular species heard.

What is claimed is:

1. A device for remote audio surveillance for detection of wildlife sounds, comprising:
   one or more batteries as a power source;
   a microphone system for receiving audio input from a first sound source, said microphone system comprising:
   first, second and third microphones, said first, second and third microphones being radially outwardly directed and angularly spaced apart substantially equidistant from each other on a horizontal plane substantially parallel to a ground surface;
   said first microphone being adapted to receive first audio input data from said first sound source;
   said second microphone being adapted to receive second audio input data from said first sound source;
   said third microphone being adapted to receive third audio input data from said first sound source;
   recorder member for recording said first, second and third audio input data;
   means for amplifying and filtering said first, second and third audio input data;
   means for storing amplified and filtered first audio input data on a removable digital mass storage device;
   means for storing amplified and filtered second audio input data on a removable digital mass storage device;
   means for storing amplified and filtered third audio input data on a removable digital mass storage device;
   programmable clock means by which said recorder can be activated, thereby enabling unattended recording;
   means to play back recorded audio;
   a directionality analysis system for conducting a directionality analysis of a wildlife-generated recorded sound, wherein said directionality analysis system receives, with said first microphone, first wildlife audio input from a first wildlife sound source;
   records, with said recorder member, said first wildlife audio input;
   determines an amplitude corresponding to said first wildlife audio input; receives, with said second microphone, second wildlife audio input from said first wildlife sound source;

records, with said recorder member, said second wildlife audio input;

determines an amplitude corresponding to said second wildlife audio input;

receives, with said third microphone, third wildlife audio input from said first wildlife sound source;

records, with said recorder member, said third wildlife audio input;

determines an amplitude corresponding to said third wildlife audio input;

determines which, among said amplitude of said first wildlife audio input and said amplitude of said second wildlife audio input and said amplitude of said third wildlife audio input, is the greatest amplitude;

identifies as being the closest to said first wildlife sound source, a microphone among said first, second and third microphones that received wildlife audio input corresponding to said greatest amplitude where referenced microphones are aligned on a horizontal plane;

a distance analysis system for conducting a distance analysis of said wildlife-generated recorded sound, wherein said distance analysis system identifies the absolute magnitude of said greatest amplitude; and calibrates a distance from said device to said first wildlife sound source based on said absolute magnitude, and on weather and seasonal conditions in the vicinity of the device;

wherein said first, second and third microphones are each recessed into a housing.

2. The device according to claim 1, wherein said directionality analysis system and said distance analysis system derive flight patterns.

3. The device according to claim 1, wherein said directionality analysis system and said distance analysis system derive roost sites.

4. A method for remote audio surveillance for detection of wildlife sounds, comprising the steps of:

providing one or more batteries as a power source;

providing a microphone system for receiving audio input from a first sound source, said microphone system comprising:

first, second and third microphones, said first, second and third microphones being radially outwardly directed and angularly spaced apart substantially equidistant from each other on a horizontal plane substantially parallel to a ground surface;

said first microphone being adapted to receive first audio input data from said first sound source;

said second microphone being adapted to receive second audio input data from said first sound source;

recording said first, second and third audio input data wherein said recording is activated via a programmable clock, thereby enabling unattended recording;

amplifying and filtering said first, second and third audio input data;

storing amplified and filtered first audio input data on a removable digital mass storage device;

storing amplified and filtered second audio input data on a removable digital mass storage device;

storing amplified and filtered third audio input data on a removable digital mass storage device;

playing back recorded audio;

conducting a directionality analysis of a wildlife-generated recorded sound, wherein said directionality analysis comprises the steps of:

receiving, with said first microphone, a first wildlife audio input from a first wildlife sound source;

recording, with said recorder member, said first wildlife audio input;

determining an amplitude corresponding to said first wildlife audio input;

receiving, with said second microphone, second wildlife audio input from said first wildlife sound source;

recording, with said recorder member, said second wildlife audio input;

determining an amplitude corresponding to said second wildlife audio input;

receiving, with said third microphone, third wildlife audio input from said first wildlife sound source;

recording, with said recorder member, said third wildlife audio input;

determining an amplitude corresponding to said third wildlife audio input;

determining which, among said amplitude of said first wildlife audio input and said amplitude of said second wildlife audio input and said amplitude of said third wildlife audio input, is the greatest amplitude;

identifying as being the closest to said first wildlife sound source, a microphone among said first, second and third microphones that received wildlife audio input corresponding to said greatest amplitude where referenced microphones are aligned on a horizontal plane;

conducting a distance analysis of said wildlife-generated recorded sound, wherein said distance analysis comprises the steps of:

identifying the absolute magnitude of said greatest amplitude;

calibrating a distance from said device to said first wildlife sound source based on said absolute magnitude, and on weather and seasonal conditions in the vicinity of the device; and providing a housing wherein said first, second and third microphones are each recessed into said housing.

5. The method according to claim 4, and further comprising:

from said directionality analysis of a wildlife-generated recorded sound and said distance analysis of said wildlife-generated recorded sound, deriving flight patterns.

6. The method according to claim 4, and further comprising:

from said directionality analysis of a wildlife-generated recorded sound and said distance analysis of said wildlife-generated recorded sound, deriving roost sites.

* * * * *